US012692635B2

(12) United States Patent　　　(10) Patent No.:　US 12,692,635 B2
Katsuya et al.　　　　　　　　　　(45) Date of Patent:　　Jul. 28, 2026

(54) LIQUID PERMEABLE BODY

(71) Applicant: KURARAY CO., LTD., Kurashiki (JP)

(72) Inventors: Satoshi Katsuya, Kurashiki (JP);
Yosuke Washitake, Kurashiki (JP);
Ryokei Endo, Chiyoda-ku (JP)

(73) Assignee: KURARAY CO., LTD., Kurashiki (JP)

( * ) Notice: Subject to any disclaimer, the term of this
patent is extended or adjusted under 35
U.S.C. 154(b) by 973 days.

(21) Appl. No.: 16/823,471

(22) Filed: Mar. 19, 2020

(65) Prior Publication Data

US 2020/0224345 A1　　Jul. 16, 2020

Related U.S. Application Data

(63) Continuation of application No.
PCT/JP2018/035440, filed on Sep. 25, 2018.

(30) Foreign Application Priority Data

Sep. 29, 2017　(JP) ................................. 2017-190888

(51) Int. Cl.
　　*D04H 1/551*　　　(2012.01)
　　*B29C 70/12*　　　(2006.01)
　　　　　　　(Continued)
(52) U.S. Cl.
　　CPC ............. *D04H 1/551* (2013.01); *D04H 1/593*
　　　　　　(2013.01); *B29C 70/12* (2013.01);
　　　　　　　　(Continued)
(58) Field of Classification Search
　　CPC .... D04H 1/551; D04H 1/593; B29K 2101/12;
　　　　　　B29K 2105/12; D10B 2401/041; D10B
　　　　　　　　2401/063; Y10T 442/00–699
　　　　　　(Continued)

(56) References Cited

U.S. PATENT DOCUMENTS 5,286,553 A　　2/1994　Haraguchi et al.
5,721,031 A　*　2/1998　Echigo ................. B01D 39/163
　　　　　　　　　　　　　　　　　　264/257
(Continued)

FOREIGN PATENT DOCUMENTS

CN　　　104246044 A　　12/2014
CN　　　104508018 A　　4/2015
　　　　　　(Continued)

OTHER PUBLICATIONS

Schwartz, Mel. (2016). Encyclopedia and Handbook of Materials,
Parts, and Finishes (3rd Edition)—Fiber Pattern. Taylor & Francis.
Retrieved from https://app.knovel.com/hotlink/pdf/id:kt011YP0C2/
encyclopedia-handbook/fiber-pattern (Year: 2016).*
(Continued)

*Primary Examiner* — Braelyn R Watson
(74) *Attorney, Agent, or Firm* — Oblon, McClelland,
Maier & Neustadt, L.L.P.

(57)　　　　　　ABSTRACT

The purpose of the present invention is to provide a liquid
permeable body comprising a porous composite that has
different liquid permeabilities between in the in-plane direc-
tion and in the out-of-plane direction as well as excellent
mechanical properties. The liquid permeable body com-
prises a porous composite having a structure in which
discontinuous reinforcing fibers are dispersed; the dispersed
discontinuous reinforcing fibers are bonded with a thermo-
plastic resin at at least an intersection thereof; voids of
continuous openings form a void content of from 30 to 90%;
an average value $\alpha$ of fiber orientation angles is from 0 to
40° in an in-plane direction of the discontinuous reinforcing
fibers; and an average value $\beta$ of fiber orientation angles is
from 0 to 25° in an out-of-plane direction of the discontinu-
ous reinforcing fibers.

12 Claims, 3 Drawing Sheets

(51) Int. Cl.

| | | |
|---|---|---|
| *B29K 101/12* | (2006.01) |
| *B29K 105/12* | (2006.01) |
| *D04H 1/593* | (2012.01) |
| *C08J 5/04* | (2006.01) |

(52) U.S. Cl.
CPC ...... *B29K 2101/12* (2013.01); *B29K 2105/12* (2013.01); *C08J 5/04* (2013.01); *D10B 2401/041* (2013.01); *D10B 2401/063* (2013.01); *D10B 2401/10* (2013.01)

(58) Field of Classification Search
USPC ..................... 442/327–417; 428/304.4–319.9
See application file for complete search history.

(56) References Cited

U.S. PATENT DOCUMENTS

| | | | |
|---|---|---|---|
| 5,858,152 | A | 1/1999 | Nagatsuka et al. |
| 8,980,053 | B2 | 3/2015 | Krahn et al. |
| 9,879,123 | B2 | 1/2018 | Sano et al. |
| 9,962,904 | B2 | 5/2018 | Hatanaka et al. |
| 11,059,261 | B2 | 7/2021 | Takebe et al. |
| 2003/0127171 | A1 | 7/2003 | Pfeffer |
| 2010/0209642 | A1* | 8/2010 | Tomioka ................. C08L 53/00 |
| | | | 428/36.9 |
| 2013/0255899 | A1 | 10/2013 | Krahn et al. |
| 2014/0094555 | A1* | 4/2014 | Hashimoto ............. B29C 70/14 |
| | | | 524/495 |
| 2014/0356612 | A1 | 12/2014 | Sano et al. |
| 2015/0140306 | A1 | 5/2015 | Endo et al. |
| 2016/0214346 | A1* | 7/2016 | Hatanaka ................. B32B 5/20 |
| 2016/0303824 | A1* | 10/2016 | Takebe .................... B32B 27/32 |
| 2017/0225373 | A1* | 8/2017 | Mitsutsuji ............... B29C 70/16 |
| 2018/0222128 | A1* | 8/2018 | Tomioka ................. B29B 15/08 |
| 2019/0002655 | A1 | 1/2019 | Takebe et al. |

FOREIGN PATENT DOCUMENTS

| | | | |
|---|---|---|---|
| CN | 105073403 | A | 11/2015 |
| CN | 105492200 | A | 4/2016 |
| EP | 0 409 993 | A1 | 1/1991 |
| EP | 2 982 504 | A1 | 2/2016 |
| JP | 08-034086 | A | 2/1996 |
| JP | 08-132438 | A | 5/1996 |
| JP | 2002-339311 | A | 11/2002 |
| JP | 2012-255065 | A | 12/2012 |
| JP | 2015-514165 | A | 5/2015 |
| JP | 2016-163956 | A | 9/2016 |
| JP | 2018-104481 | A | 7/2018 |
| WO | WO 2013/108811 | A1 | 7/2013 |
| WO | WO 2013/148989 | A1 | 10/2013 |
| WO | WO 2014/162873 | A1 | 10/2014 |
| WO | WO 2017/110528 | A1 | 6/2017 |

OTHER PUBLICATIONS

Polyetherimide—Properties, Wikipedia, 2022. (Year: 2022).*
Sastri, Vinny R. "High-temperature engineering thermoplastics: polysulfones, polyimides, polysulfides, polyketones, liquid crystalline polymers, and fluoropolymers." Plastics in Medical Devices Properties, Requirements and Applications 5.1 (2014): 173-213. (Year: 2014).*
International Search Report issued Dec. 25, 2018 in PCT/JP2018/035440 filed on Sep. 25, 2018, 2 pages.
Extended European Search Report issued May 17, 2021 in European Patent Application No. 18861294.9, 8 pages.
Combined Chinese Office Action and Search Report issued Jan. 26, 2022 in Chinese Patent Application No. 201880063330.1 (with English translation), 12 pages.
European Office Action issued Jan. 27, 2022 in European Patent Application No. 18 861 294.9, 4 pages.

\* cited by examiner

1

3

LIQUID PERMEABLE BODY

CROSS REFERENCE TO THE RELATED APPLICATION

This application is a continuation application, under 35 U.S.C § 111(a) of international application No. PCT/JP2018/035440, filed Sep. 25, 2018, which claims priority to Japanese patent application No. 2017-190888, filed Sep. 29, 2017, the entire disclosure of which is herein incorporated by reference as a part of this application.

FIELD OF THE INVENTION

The present invention relates to a liquid permeable body comprising a porous composite that has different liquid permeabilities between in an in-plane direction and in an out-of-plane direction and that has excellent mechanical properties.

BACKGROUND OF THE INVENTION

Materials that have continuous openings therein, such as nonwoven fabrics and sponge-like materials, are capable of allowing liquid permeated, and thus application of such materials to agricultural materials, civil engineering materials, artificial turfs, water treatment filters, concrete formworks, etc., has been studied.

For example, Patent Document 1 (JP Laid-open Patent Publication No. 2002-339311) discloses an artificial turf integrated with a water-introducing sheet. Patent Document 1 mentions, as the water-introducing sheet, a nonwoven fabric. In addition, Patent Document 2 (JP Laid-open Patent Publication No. H08-034086) discloses a laminate of a perforated polyolefin film and a fiber-reinforced polyolefin resin porous body. According to this invention, short fibers and polyolefin resin powders are subject to paper-making process so as to a composite sheet, and the composite sheet is heated under pressure and then also cooled under pressure, thereby producing a fiber-reinforced polyolefin resin porous body. Since the fiber-reinforced polyolefin resin porous body contributes to improvement in strength of the porous resin laminate, and the perforated polyolefin film has specific pore diameters, the disclosed laminate is capable of controlling water permeability and gas permeability.

SUMMARY OF THE INVENTION

Problems to be Solved by the Invention

However, Patent Documents 1 and 2 only provide controlled amount of liquid permeation. In other words, it is not possible to control anisotropy of liquid permeability such that, for example, a liquid is allowed to flow only in a specific direction in a body.

The present invention has been made to solve the problem in such conventional art, and provides a liquid permeable body comprising a porous composite that has different liquid permeabilities between in the in-plane direction and in the out-of-plane direction and that preferably further has excellent mechanical properties.

Means for Solving the Problems

The present inventors have conducted thorough research for solving the above problem, and, as a result, have found that a liquid permeable body that is capable of controlling anisotropy and has high liquid permeability, and high strength and high rigidity can be obtained by providing with a porous composite having a structure in which discontinuous reinforcing fibers are dispersed; the dispersed discontinuous reinforcing fibers are bonded with a thermoplastic resin at at least an intersection thereof; voids of continuous openings form a void content of 30 to 90%; an average value $\alpha$ of fiber orientation angles is from 0 to 40° in the in-plane direction of the discontinuous reinforcing fibers; and an average value $\beta$ of fiber orientation angles is from 0 to 25° in the out-of-plane direction of the discontinuous reinforcing fibers. Then, the present inventors have completed the present invention.

That is, the present invention may include the following aspects.

Aspect 1

A liquid permeable body comprising a porous composite having a structure in which discontinuous reinforcing fibers are dispersed; the dispersed discontinuous reinforcing fibers are bonded with a thermoplastic resin at at least an intersection thereof; voids of continuous openings form a void content of from 30 to 90% (preferably from 35 to 88%, more preferably from 40 to 86%); an average value $\alpha$ of fiber orientation angles in an in-plane direction of the discontinuous reinforcing fibers is from 0 to 40° (preferably from 0 to 38°, more preferably from 0 to 36°); and an average value $\beta$ of fiber orientation angles in an out-of-plane direction of the discontinuous reinforcing fibers is from 0 to 25° (preferably from 0 to 20°, more preferably from 0 to 15°).

Aspect 2

The liquid permeable body according to aspect 1, wherein the thermoplastic resin has a glass transition temperature of equal to or higher than 100° C. (preferably equal to or higher than 105° C., more preferably equal to or higher than 110° C.).

Aspect 3

The liquid permeable body according to aspect 1 or 2, wherein the thermoplastic resin is at least one thermoplastic resin selected from the group consisting of polyetherimide-based resins, semi-aromatic poly amide-based resins, polyether ether ketone-based resins, and polycarbonate-based resins.

Aspect 4

The liquid permeable body according to any one of aspects 1 to 3, wherein the discontinuous reinforcing fibers have an average fiber length of from 3 to 50 mm (preferably from 4 to 40 mm, more preferably from 5 to 30 mm).

Aspect 5

The liquid permeable body according to any one of aspects 1 to 4, wherein a weight proportion (proportion by weight) of the discontinuous reinforcing fibers in the porous composite is from 15 to 80% (preferably from 20 to 75%, more preferably from 25 to 70%).

Aspect 6

The liquid permeable body according to any one of aspects 1 to 5, wherein the liquid permeable body has a bending strength of equal to or greater than 30 MPa (preferably equal to or greater than 35 MPa, more preferably equal to or greater than 40 MPa) and a bending elastic modulus of equal to or greater than 3.0 GPa (preferably equal to or greater than 3.5 GPa, more preferably equal to or greater than 4.0 GPa).

Aspect 7

The liquid permeable body according to any one of aspects 1 to 6, wherein a liquid-permeation anisotropic value in the in-plane direction with respect to the out-of-plane direction (in-plane liquid-permeation speed/out-of-plane liquid-permeation speed) is from 2.0 to 12.0.

In the present invention, the in-plane direction means a direction existing in a certain reference plane when the reference plane is defined, and the out-of-plane direction means a direction that is normal to the reference plane.

The present invention encompasses any combination of at least two features disclosed in the claims and/or the specification and/or the drawings. In particular, any combination of two or more of the appended claims should be equally construed as included within the scope of the present invention.

According to the present invention, a liquid permeable body having anisotropic liquid permeability in the in-plane direction and the out-of-plane direction can be obtained. Furthermore, the liquid permeable body according to the present invention is used preferably for components that make use of anisotropic liquid permeability of the liquid permeable body, more preferably for components that further require mechanical properties, and the like in agricultural materials, industrial materials, civil engineering materials, various transportation vehicles, and the like.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the figures.

DESCRIPTION OF THE EMBODIMENTS

Figure 1:
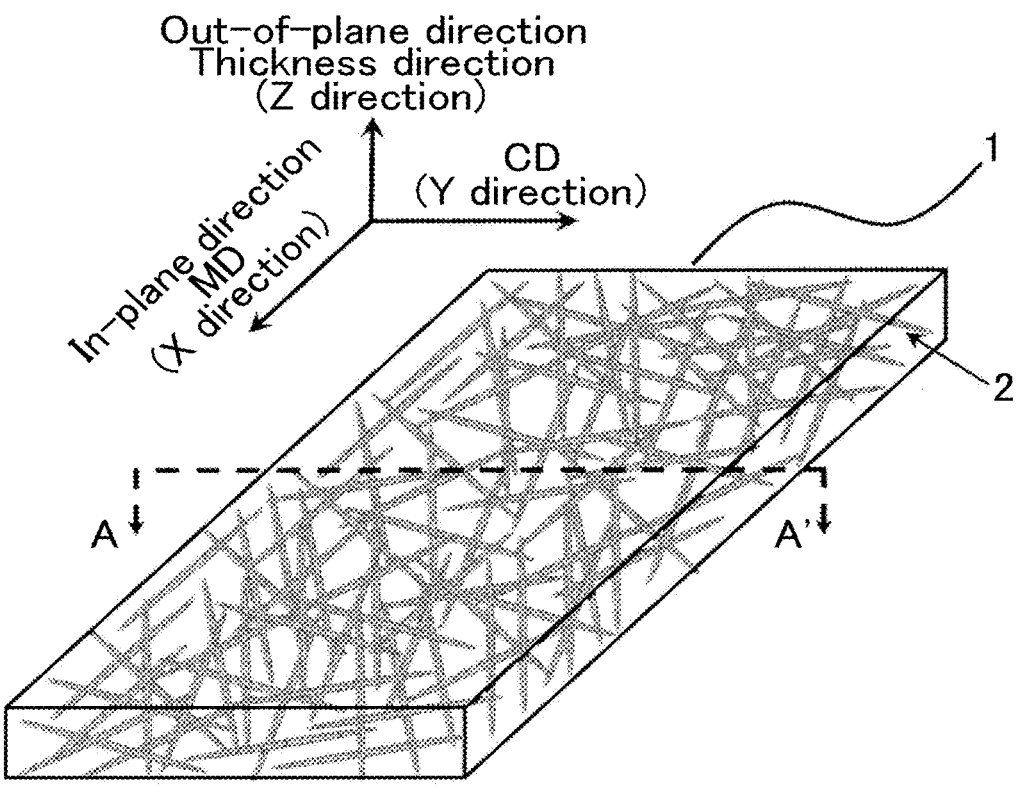
FIG. 1 is a schematic transparent perspective view for describing arrangement of fibers in a liquid permeable body as well as an intermediate composite of the present invention.

Hereinafter, the present invention will be described in detail. The description of components described below may be given based on typical embodiments and specific examples, but the present invention is not limited to such embodiments.

The liquid permeable body according to the present invention comprises a porous composite having a structure in which discontinuous reinforcing fibers are dispersed and the dispersed discontinuous reinforcing fibers are bonded with a thermoplastic resin at at least an intersection thereof. As the method of bonding discontinuous reinforcing fibers with a thermoplastic resin, there may be exemplified a method comprising preparing a mixed nonwoven fabric of the discontinuous reinforcing fibers and fibers comprising the thermoplastic resin (hereinafter, referred to as thermoplastic fibers), heating the mixed nonwoven fabric to allow the thermoplastic fibers melted, and then cooling the resultant to be solidified, so that the discontinuous reinforcing fibers are bonded to each other.

Discontinuous Reinforcing Fiber

The discontinuous reinforcing fibers used in the present invention are not particularly limited to a specific one as long as it does not impair the effect of the present invention. The discontinuous reinforcing fiber may be an organic fiber and/or an inorganic fiber, and can be used singly or in combination of two or more. Specific examples of the inorganic fiber may include a glass fiber, a carbon fiber, a silicon carbide fiber, an alumina fiber, a ceramic fiber, a basalt fiber, various metal fibers (e.g., fibers of gold, silver, copper, iron, nickel, titanium, stainless steel, etc.), and the like. Examples of organic fibers may include a wholly aromatic polyester-based fiber, a polyphenylene sulfide-based fiber, a para-aramid-based fiber, a polysulfone amide-based fiber, a phenol resin-based fiber, a polyimide-based fiber, a fluorine-containing fiber, and the like.

The discontinuous reinforcing fibers used in the present invention preferably have an elastic modulus of equal to or greater than 10 GPa. The elastic modulus is more preferably equal to or greater than 30 GPa and most preferably equal to or greater than 50 GPa. If the elastic modulus is excessively low, it may be difficult to maintain opening spaces provided with continuous openings, so that there is a possibility that a high porosity cannot be obtained. The upper limit of the elastic modulus is not particularly limited, and the elastic modulus may be equal to or less than 2000 GPa. The elastic modulus of the discontinuous reinforcing fibers represents a tensile elastic modulus.

The discontinuous reinforcing fibers used in the present invention preferably have an average length of from 3 to 50 mm. The average length is more preferably from 4 to 40 mm and most preferably from 5 to 30 mm. If the average length is excessively short, the resilient power caused by packed fibers is reduced, so that there is a possibility that a high void content cannot be obtained. In addition, if the average length is excessively long, the fibers excessively entangled with each other may cause deteriorated process passability during the production of the porous composite constituting the liquid permeable body, so that there is a possibility that uniform openings cannot be obtained.

The discontinuous reinforcing fibers preferably have an average diameter of from 2 to 40 μm. The average diameter is more preferably from 3 to 30 μm and most preferably from 5 to 25 μm. If the average diameter is excessively small, the resilient power caused by packed fibers may be reduced, so that there is a possibility that a high void content cannot be obtained. In addition, if the average diameter is excessively large, the number of constituent fibers in the porous composite may be decreased, and there is a possibility that a high void content cannot be obtained.

The weight proportion of the discontinuous reinforcing fibers in the porous composite constituting the liquid permeable body is preferably from 15 to 80%. The weight proportion is more preferably from 20 to 75% and further preferably from 25 to 70%. If the weight proportion of the discontinuous reinforcing fibers is excessively low, the discontinuous reinforcing fibers contributing to the void content of the continuous openings are insufficient, so that there is a possibility that a high void content cannot be obtained. If the weight proportion of the discontinuous reinforcing fibers is excessively high, the amount of the resin used for bonding the discontinuous reinforcing fibers to each other may be insufficient, so that there is a possibility that strength as a structure cannot be obtained.

Thermoplastic Resin

The thermoplastic resin used in the present invention is not particularly limited to a specific one as long as the thermoplastic resin is capable of heat-melting or heat-flowing. From the viewpoint of controlling liquid permeability for thermal fluid, a thermoplastic resin having a glass transition temperature of equal to or higher than 100° C. is preferably used. The upper limit of the glass transition temperature is not particularly limited, and the glass transition temperature is preferably equal to or lower than 300° C. In general, it is well known that the mechanical properties such as strength and elastic modulus of a polymer significantly decrease at the glass transition temperature at which molecules in an amorphous portion start moving. For example, even if some thermoplastic resins, such as polyethylene terephthalate (PET) and nylon 6, have a melting point of equal to or higher than 200° C., since mechanical properties of such thermoplastic resins significantly decrease at the glass transition temperature around 60 to 80° C., such thermoplastic resins would not be regarded as having excellent heat resistance. Accordingly, thermoplastic resins having a glass transition temperature lower than 100° C. cannot contribute to high heat resistance of the resin composite, resulting in restricted practical use of the resin composite. In contrast, the glass transition temperature of the thermoplastic resin used in the present invention is preferably equal to or higher than 105° C. and further preferably equal to or higher than 110° C. The glass transition temperature in the present invention can be determined by measuring the temperature dependence of a loss tangent (tan δ) at a frequency of 10 Hz and a heating rate of 10° C./min using the solid dynamic viscoelasticity analyzer "Rheospectra DVE-V4" manufactured by Rheology Co., Ltd. to find a peak temperature of the loss tangent (tan δ). Here, the peak temperature of tan δ means a temperature at which the primary differential value of an amount of change in the value of tan δ with respect to temperature is zero.

The thermoplastic resin used in the present invention is not particularly limited to a specific one as long as the thermoplastic resin is capable of heat-melting or heat-flowing, and may be used singly or in combination of two or more. Specific examples of the thermoplastic resin include general-purpose resins having a glass transition temperature lower than 100° C. such as a vinyl-based resin (polymer or derivative obtained from monomers having a vinyl group $CH_2=CH-$ or a vinylidene group $CH_2=C<$), a polyamide-based resin, and a polyester-based resin. Preferred examples of the thermoplastic resin having a glass transition temperature of equal to or higher than 100° C. may include a polytetrafluoroethylene-based resin, a polyetherimide-based resin, a polysulfone-based resin, s semi-aromatic poly-amide-based resin, a polyether ether ketone-based resin, a polycarbonate-based resin, and a polyarylate-based resin. Among them, from the viewpoint of mechanical properties, flame retardancy, heat resistance, moldability, and/or easy availability, a polyetherimide-based resin, a semi-aromatic polyamide-based resin, a polyether ether ketone-based resin, and a polycarbonate-based resin are suitably used.

The thermoplastic fibers used in the present invention may include an antioxidant, an antistatic agent, a radical inhibitor, a delustering agent, an ultraviolet absorption agent, a flame retardant, an inorganic substance, and others, as long as it does not impair the effect of the present invention. Specific examples of such inorganic substance may include: a carbon nanotube; a fullerene; a silicate material such as a talc, a wollastonite, a zeolite, a sericite, a mica, a kaolin, a clay, a pyrophyllite, a silica, a bentonite and an alumina silicate; a metal oxide such as a silicon oxide, a magnesium oxide, an alumina, a zirconium oxide, a titanium oxide and an iron oxide; a carbonate such as a calcium carbonate, a magnesium carbonate and a dolomite; a sulfate such as a calcium sulfate and a barium sulfate; a hydroxide such as a calcium hydroxide, a magnesium hydroxide and an aluminum hydroxide; a glass bead; a glass flake; a glass powder; a ceramic bead; a boron nitride; a silicon carbide; a carbon black; a silica; a graphite; and others.

In the case where the thermoplastic resin is used in the form of fibers, the production method of the thermoplastic fibers is not particularly limited, and a known melt spinning apparatus can be used. That is, the thermoplastic fibers can be obtained by melt-kneading pellets and/or powders of the thermoplastic resin using a melt-extruder, leading the molten polymer to a spinning cylinder, metering the molten polymer with a gear pump, and discharging the molten polymer from spinning nozzles and winding up discharged filaments. The taken-up speed at the time of winding is not particularly limited, and is preferably in a range of 500 m/min to 4000 m/min, since it is not preferred if molecular orientation occurs along the spinning lines. It is not preferred in terms of productivity if the taken-up speed is excessively low. On the other hand, excessively high taken-up speed may proceed molecular orientation cause shrinkage at high temperatures, in addition, may cause breakage of the fibers during production. The taken-up speed may be more preferably from 800 m/min to 3500 m/min and further preferably from 1000 m/min to 3000 m/min.

The thermoplastic fibers used in the present invention preferably have a single fiber fineness of from 0.1 to 10 dtex. In order to obtain a liquid permeable body having excellent mechanical properties and liquid permeability, it is desirable to disperse the discontinuous reinforcing fibers without unevenness in the mixed nonwoven fabric used as a precursor (intermediate product). In general, the mixed nonwoven fabrics containing the thermoplastic fibers at the same weight proportion, the smaller the single fiber fineness is, the larger the number of thermoplastic fibers in the mixed nonwoven fabric is, so that the thermoplastic fibers cannot disperse the discontinuous reinforcing fibers without unevenness. On the other hand, if the single fiber fineness is excessively small, the thermoplastic fibers easily get entangled with each other in the nonwoven fabric production process, so that there is a possibility that the thermoplastic fibers cannot disperse the reinforcing fibers without uneven-ness. Moreover, in the case of producing a nonwoven fabric from the thermoplastic fibers with excessively small single fiber fineness by wet-laid paper-making, there is a possibility that the process passability is significantly deteriorated, for example, the drainage during the process is deteriorated. In contrast, if the single fiber fineness of the thermoplastic fibers is excessively large, the number of thermoplastic fibers contained in the mixed nonwoven fabric is excessively small, so that there is a possibility that the thermoplastic fibers cannot disperse the reinforcing fibers without uneven-ness. The single fiber fineness of the thermoplastic fibers is more preferably from 0.2 to 9 dtex and further preferably from 0.3 to 8 dtex.

The thermoplastic fibers used in the present invention preferably have an average fiber length of single fibers of from 0.5 to 60 mm. If the average fiber length is excessively short, the fibers may fall off during the nonwoven fabric production process, and, especially in the case of producing a nonwoven fabric by wet-laid paper-making, there is a possibility that the process possibility is significantly deteriorated, for example, the drainage during the process is deteriorated. If the average fiber length is excessively long, there is a possibility that, in the nonwoven fabric production process, due to entanglement of the thermoplastic fibers, the thermoplastic fibers cannot uniformly disperse the reinforcing fibers. The average fiber length is more preferably from 1 to 55 mm and further preferably from 3 to 50 mm. The cross-sectional shapes of the fibers are also not particularly limited, and may be circular, hollow, flat, or modified cross-sectional shape such as a star shape.

Mixed Nonwoven Fabric

The proportion of the thermoplastic fibers in the mixed nonwoven fabric used in the present invention is preferably from 20 to 85 wt %. The excessively low proportion of the thermoplastic fibers may contribute to too small amount of the thermoplastic resin in a porous composite obtained from the thermoplastic fibers, so that there is a possibility that strength sufficient to form a liquid permeable body cannot be obtained. The excessively high proportion of the thermoplastic fibers may cause a reduced proportion of discontinuous reinforcing fibers (hereinafter, sometimes referred to simply as reinforcing fibers) in the nonwoven fabric to lead a porous composite with a low void content. As a result, there is a possibility that sufficient liquid permeability cannot be obtained. The proportion of the thermoplastic fibers is more preferably from 25 to 80 wt % and further preferably from 30 to 75 wt %.

A production method for the mixed nonwoven fabric used in the present invention is not particularly limited, and examples of the production method may include a spunlace method, a needle punch method, a steam jet method, a dry-laid paper-making method, and a wet-laid paper-making method. Among them, in terms of production efficiency and uniform dispersion of the reinforcing fibers in the nonwoven fabric, a wet-laid paper-making method is preferable. For example, in a wet-laid paper-making method, an aqueous slurry containing the thermoplastic fibers and the reinforcing fibers may be prepared, and then the slurry may be subjected to a normal paper-making process. The aqueous slurry may contain a binder (for example, water-soluble polymer fibers such as polyvinyl alcohol fibers, heat-bondable fibers such as PET fibers, a pulp-like material of para-aramid fibers or wholly aromatic polyester fibers), and the like. In addition, in order to improve the uniformity and the pressure bonding property of paper-like nonwoven fabric, a binder may be applied by spray drying, and/or a hot pressing process may be added after the wet-laid paper-making process.

In the case of producing a nonwoven fabric by a wet-laid paper-making method, the paper-making speed is preferably equal to or greater than 2 m/min. The paper-making speed is more preferably equal to or greater than 3 m/min and further preferably equal to or greater than 5 m/min. Increased speed of the paper-making speed makes the orientation directions of the reinforcing fibers and the thermoplastic fibers to be unified (uni-direction), as well as facilitate orientation directions of most of the reinforcing fibers and the thermoplastic fibers to be parallel to the surface of the porous composite. As a result, anisotropy of liquid permeability in the in-plane direction and the out-of-plane direction can be provided to the porous composite. If the paper-making speed is excessively low, it is difficult to provide anisotropy of fiber orientation, and therefore anisotropy of liquid permeability cannot be provided. In addition, the upper limit of the paper-making speed is not particularly limited, and the paper-making speed may be equal to or less than 50 m/min. If the paper-making speed is excessively high, unevenness of the basis weight of the nonwoven fabric is increased, and density unevenness or the like occurs in a composite obtained using the nonwoven fabric, so that there is a possibility that it becomes difficult to control liquid permeability.

The basis weight of the mixed nonwoven fabric is not particularly limited, and is preferably from 5 to 1500 g/m². The basis weight of the mixed nonwoven fabric is more preferably from 10 to 1000 g/m² and further preferably from 20 to 500 g/m². If the basis weight is excessively small, there is a possibility that the process passibility is deteriorated due to low strength of the nonwoven fabric. If the basis weight is excessively large, there is a possibility that fine adjustment of void content becomes difficult.

Porous Composite

The method for obtaining the porous composite that constitutes a liquid permeable body according to the present invention is not particularly limited. For example, examples of the method include a method in which the mixed nonwoven fabric is subjected to compression heat-molding to form an intermediate composite, and then the intermediate composite is thermally expanded to have a predetermined void content. In this method, one or a plurality (for example, from 2 to 100, preferably from 10 to 80, more preferably from 20 to 60) of the mixed nonwoven fabrics are stacked, pressed and heated at a temperature of equal to or higher than the flow start temperature of the thermoplastic fibers, and then cooled while being pressed, whereby an intermediate composite is produced. Next, while the thickness of the composite is controlled, the intermediate composite is heated at a temperature of equal to or higher than the flow start temperature of the thermoplastic resin so as to be expanded, and is then cooled, whereby a porous composite having a predetermined void content is produced.

During a production process of an intermediate composite, the thermoplastic fibers give the discontinuous reinforcing fibers bent shapes by heating the thermoplastic fibers under pressure at a temperature of equal to or higher than the flow start temperature of the thermoplastic fibers, and then cooling the resultant under pressure. As a result, the discontinuous reinforcing fibers in the obtained intermediate composite are temporarily fixed in a bent state. When the intermediate composite obtained in such a way as described above is heated at a temperature of equal to or higher than the flow start temperature of the thermoplastic resin in order to release the fixed bent state of the discontinuous reinforcing fibers, the bent state of the discontinuous reinforcing fibers restrained by the thermoplastic resin is released, resulting in expansion of the intermediate composite.

When producing a porous composite from a pre-expanded intermediate composite, the expansion rate when producing a porous composite from the intermediate composite before expansion is preferably from 40 to 900%. The expansion rate is more preferably from 60 to 850% and further preferably from 80 to 800%. If the expansion rate is excessively low, the void content of the obtained porous composite may be low, so that there is a possibility that sufficient liquid permeability cannot be obtained. If the expansion rate is excessively high, strength of an obtained structure may be insufficient. Here, the expansion rate is represented by the following equation:

> Expansion rate (%)=((thickness (mm) of porous composite after expansion−thickness (mm) of intermediate composite before expansion)/thickness (mm) of intermediate composite before expansion)×100

According to the present invention, it is possible to achieve a desired anisotropic liquid permeability by controlling the orientation of the discontinuous reinforcing fibers in the in-plane direction as well as in the out-of-plane direction.

The in-plane direction and the out-of-plane direction, and the in-plane orientation and the out-of-plane orientation of the fibers will be described with reference to FIGS. 1 to 3.

Figure 2:
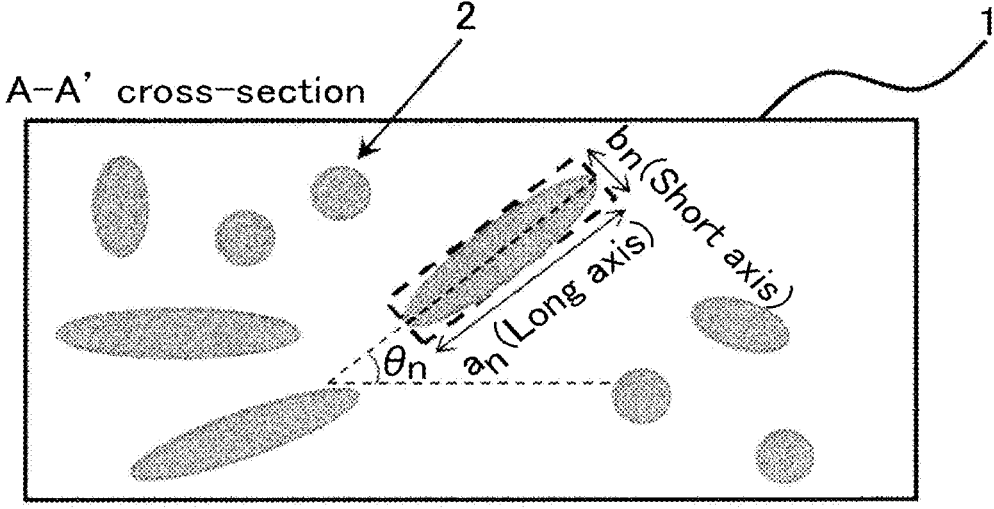
FIG. 2 is a cross-sectional view taken along a line A-A' in FIG. 1.

FIG. 1 is a schematic transparent perspective view for describing arrangement of the fibers of the porous composite as well as the intermediate composite of the present invention. For example, in FIG. 1, the porous composite and the intermediate composite are plate-shaped bodies having a predetermined thickness, and are defined in an MD direction, a CD direction, and a thickness direction. Hereinafter, the MD direction, the CD direction, and the thickness direction are sometimes referred to as an X direction, a Y direction, and a Z direction, respectively.

More specifically, the in-plane direction and the out-of-plane direction in the present invention are described as follows. For example, as shown in FIG. 1, when a plane (XY plane) including an axis along the MD direction (X direction) and an axis along the CD direction (Y direction) of the mixed nonwoven fabric is set as a reference plane, the stacking direction of the mixed nonwoven fabric, that is, the thickness direction (Z direction) of the porous composite or the intermediate composite is set as an out-of-plane direction normal to the reference plane. In addition, the in-plane direction may be either the X direction normal to a plane (YZ plane) including the axis along the Y direction and an axis along the Z direction, or the Y direction normal to a plane (ZX plane) including the axis along the Z direction and the axis along the X direction. The in-plane direction may be either X or Y direction with respect to which an average value $\alpha$ is equal to or less than 45° in the later-described measurement of the fiber orientation angles in the in-plane direction of the discontinuous reinforcing fibers.

The in-plane orientation and the out-of-plane orientation of the fibers can be calculated by the following method.

First, a cut plane of a plate-shaped body is defined as a plane perpendicular to the XY plane of the plate-shaped body. For example, FIG. 2 shows here an A-A' cross-sectional plane perpendicular to the X direction. As for a predetermined number of cross-sections of fibers exposed on the cut plane, each fiber is measured regarding long axis "a" and short axis "b" on the cut plane. Then as for each of the measured fibers, angle "0" (0°≤θ≤90°) defined by the XY plane (for example, the axis along the Y direction in FIG. 2) and the long axis of the cross-section of the fiber is measured.

Figure 3:
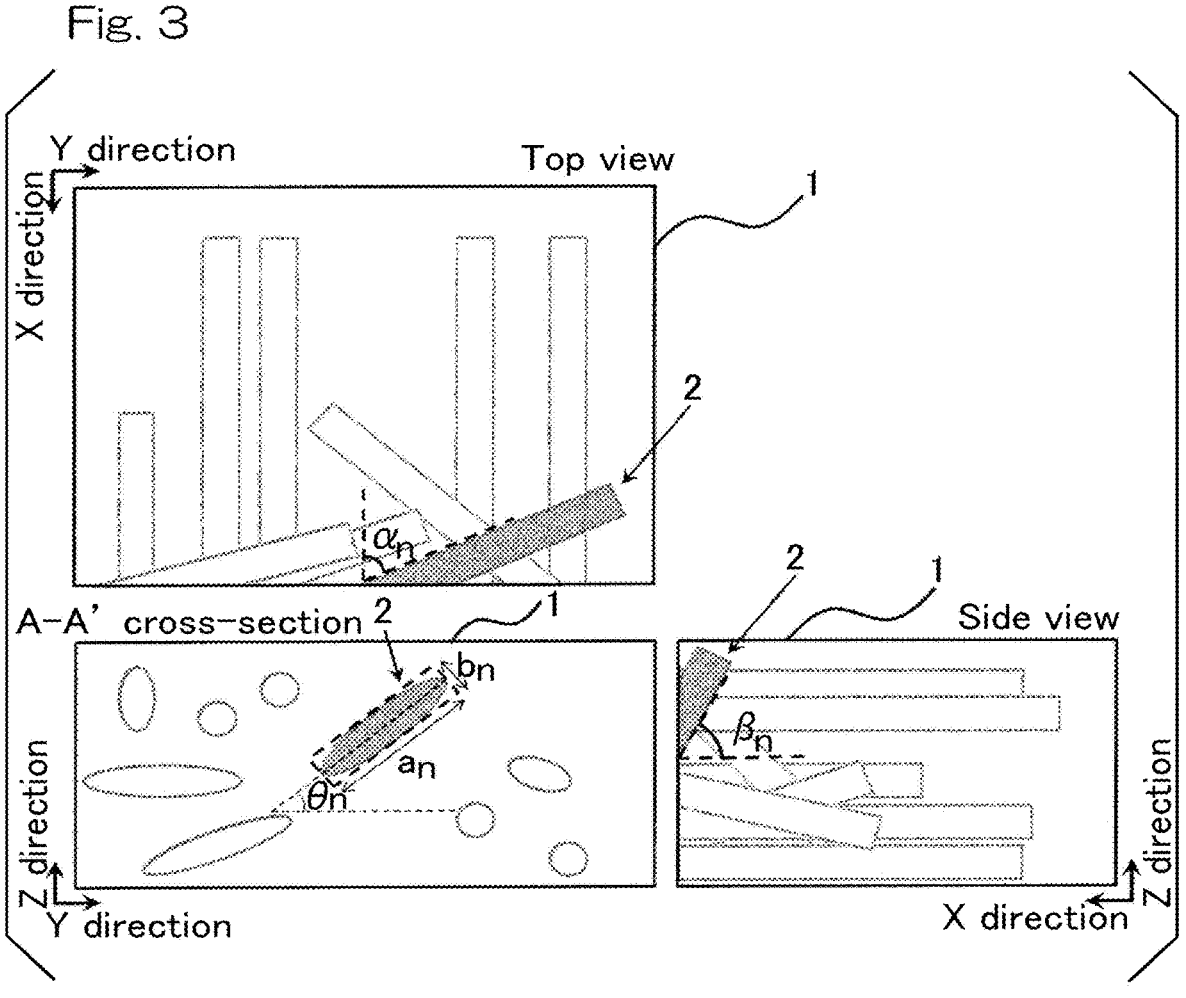
FIG. 3 is a schematic diagram of an observation method for a fiber orientation angle.
Figure 4:
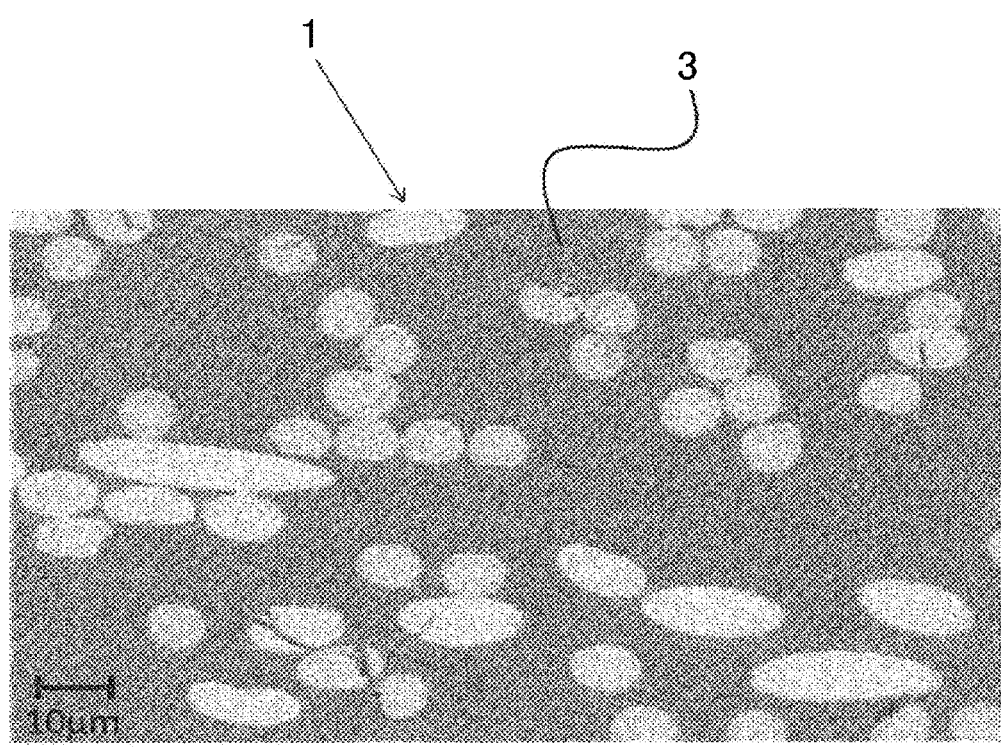
FIG. 4 is an SEM photograph of a cross-section of the liquid permeable body according to the present invention.

Next, these values are calculated by equations described later, and an in-plane orientation angle $\alpha_n$ and an out-of-plane orientation angle $\beta_n$ of each fiber can be calculated (FIG. 3).

Then, the average values $\alpha$ and $\beta$ of the fiber orientation angles can be calculated by averaging the obtained in-plane orientation angles $\alpha_n$ and the obtained out-of-plane orientation angles $\beta_n$ of the respective fibers, respectively. Specifically, the average value $\alpha$ of the fiber orientation angles in the in-plane direction and the average value $\beta$ of the fiber orientation angles in the out-of-plane direction of the discontinuous reinforcing fibers are values measured in accordance with a method described in Examples described later.

The average values of the fiber orientation angles make it possible to determine a general orientation of the reinforcing fibers.

For example, where the average value $\alpha$ of the fiber orientation angles is 5° in the in-plane direction, it can be regarded that the fibers are oriented substantially parallel to either the X direction or the Y direction as a whole in the XY plane. In addition, for example, where the average value $\beta$ of the fiber orientation angles is 5° in the out-of-plane direction, it can be regarded that the fibers are oriented substantially parallel to the X direction as a whole in the ZX plane.

The average value $\alpha$ of the fiber orientation angles is preferably from 0 to 40° in the in-plane direction of the intermediate composite. The average value $\alpha$ is more preferably from 0 to 38° and further preferably from 0 to 36°. If the intermediate composite has excessively large average value of the fiber orientation angles in the in-plane direction, there is a possibility that anisotropy in the in-plane direction of liquid permeability cannot be obtained in the produced porous composite. In addition, the average value $\beta$ of the fiber orientation angles is preferably from 0 to 20° in the out-of-plane direction of the intermediate composite. The average value $\beta$ is more preferably from 0 to 15° and further preferably from 0 to 10°. If the intermediate composite has excessively large fiber orientation angles in the out-of-plane direction, an amount of liquid outflow in the out-of-plane direction comes to be too much increased with respect to an amount of liquid permeated flow in the in-plane direction, so that there is a possibility that the liquid permeability of the porous composite cannot be controlled.

This method utilizing an intermediate composite having no openings has advantages, such as excellent handleability and uniform distribution (spread) of the resin in the intersections of the reinforcing fibers.

It is important that the porous composite constituting the liquid permeable body according to the present invention has a void content of from 30 to 90% provided by continuous openings. The void content is more preferably from 35 to 88% and further preferably from 40 to 86%. If the void content is excessively low, the percentage of the continuous openings being capable of permeating liquid in the porous composite is low, so that there is a possibility that the performance as a liquid permeable body is insufficient. If the void content is excessively high, there is a possibility that mechanical properties required as a structural material cannot be obtained. Here, the void content indicates the ratio of the volumes of the openings to the bulk volume of the porous composite, and is a value measured in accordance with a method described in Examples described later.

In the porous composite constituting the liquid permeable body according to the present invention, it is important that the average value $\alpha$ of the fiber orientation angles is from 0 to 40° in the in-plane direction of the discontinuous reinforcing fibers. The average value $\alpha$ is more preferably from 0 to 38° (for example, from 0.5 to 38°) and further preferably from 0 to 36° (for example, from 1 to 36°). If the porous composite has excessively large the average value $\alpha$ of the fiber orientation angles in the in-plane direction is excessively large, anisotropy in the in-plane direction of liquid permeability cannot be obtained. In addition, it is important that the average value $\beta$ of the fiber orientation angles is from 0 to 25° in the out-of-plane direction of the discontinuous reinforcing fibers. The average value $\beta$ is more preferably from 0 to 20° (for example, from 0.5 to 20°) and further preferably from 0 to 15° (for example, from 1 to 15°). If the expanded porous composite has excessively large the average value $\beta$ of the fiber orientation angles in the out-of-plane direction, an amount of liquid outflow in the out-of-plane direction comes to be too much increased with respect to an amount of liquid permeated flow in the in-plane direction, so that the liquid permeability cannot be controlled. From the viewpoint of reducing the liquid permeability in the in-plane direction compared with the liquid permeability in the out-of-plane direction, the porous composite constituting the liquid permeable body according to the present invention may have a ratio $\alpha/\beta$ of the average value $\alpha$ with respect to the average value $\beta$ of from 1.1 to 5.0, preferably from 1.2 to 4.0 and more preferably from 1.3 to 3.0 in which $\alpha$ and $\beta$ denotes the average values of the fiber orientation angles of the discontinuous reinforcing fibers in the in-plane direction and in the out-of-plane direction, respectively.

In the case of producing the porous composite constituting the liquid permeable body according to the present invention by thermal expansion of an intermediate composite, the thermal expansion increases the fiber orientation angles in the out-of-plane direction in the porous composite. In consideration of this increase, the fiber orientation angles in the out-of-plane direction of the intermediate composite preferably have values less than an appropriate range of the fiber orientation angles in the out-of-plane direction of the porous composite.

From the viewpoint that the porous composite constituting the liquid permeable body according to the present invention has anisotropic liquid permeability in the in-plane direction, the porous composite may have a liquid-permeation anisotropic value in the in-plane direction of equal to or greater than 1.3, preferably equal to or greater than 1.5, and more preferably equal to or greater than 2.0 in accordance with the liquid-permeation speed evaluation described in Examples described later. The upper limit of the liquid-permeation anisotropic value in the in-plane direction is not particularly limited, and the liquid-permeation anisotropy in the in-plane direction may be, for example, about 8.0.

From the viewpoint of inhibiting outflow of a liquid in the out-of-plane direction with respect to permeation of the liquid in the in-plane direction of the porous composite, the porous composite may have a liquid-permeation anisotropic value in the in-plane direction with respect to the out-of-plane direction of equal to or greater than 2.0, and may be preferably equal to or greater than 3.0 and more preferably equal to or greater than 4.0 in accordance with liquid-permeation speed evaluation described in Examples described later. The upper limit of the liquid-permeation anisotropic value in the in-plane direction with respect to the out-of-plane direction is not particularly limited, and the liquid-permeation anisotropic value in the in-plane direction with respect to the out-of-plane direction may be, for example, about 12.0.

The porous composite constituting the liquid permeable body according to the present invention preferably has a bending strength of equal to or greater than 30 MPa and a bending elastic modulus of equal to or greater than 3.0 GPa. The bending strength is more preferably equal to or greater than 35 MPa and particularly preferably equal to or greater than 40 MPa. In addition, the bending elastic modulus is more preferably equal to or greater than 3.5 GPa and particularly preferably equal to or greater than 4.0 GPa. The upper limit is not particularly limited, and the bending strength is preferably equal to or less than 500 MPa. In addition, the bending elastic modulus is preferably equal to or less than 50 GPa. If the bending strength is excessively low, durability as a liquid permeable body may be insufficient. If the bending elastic modulus is excessively low, rigidity as a liquid permeable body may be insufficient. The bending strength and the bending elastic modulus of the porous composite are values measured in accordance with methods described in Examples described later.

The basis weight of the porous composite constituting the liquid permeable body according to the present invention may be from 100 to 10000 g/m$^2$, and may be preferably from 500 to 9000 g/m$^2$ and more preferably from 800 to 8000 g/m$^2$. The basis weight of the porous composite is a value measured in accordance with a method described in Examples described later.

The thickness of the porous composite constituting the liquid permeable body according to the present invention may be from 1 to 200 mm, and may be preferably from 3 to 180 mm and more preferably from 5 to 150 mm.

The shape of the porous composite constituting the liquid permeable body according to the present invention is not limited to a plate shape, and a solid shape having a three-dimensional structure is also included. Even in the case with a solid shape, the in-plane direction and the out-of-plane direction can be defined by defining a plane in which favorable liquid permeability is required, as a reference plane.

The method for heat-molding the mixed nonwoven fabric in order to obtain the porous composite constituting the liquid permeable body according to the present invention is not particularly limited, and common compression molding such as stampable molding, pressure molding, vacuum compression molding, and GMT molding is suitably used. The molding temperature of the mixed nonwoven fabric may be set in accordance with the flow start temperature and decomposition temperature of the thermoplastic fibers used. For example, in the case where the thermoplastic fibers are crystalline, the molding temperature is preferably in the range of equal to or higher than the melting point of the thermoplastic fibers and equal to or lower than [melting point+100]° C. In addition, in the case where the thermoplastic fibers are amorphous, the molding temperature is preferably in the range of equal to or higher than the glass transition temperature of the thermoplastic fibers and equal to or lower than [glass transition temperature+200]° C. If necessary, preheating can be performed using an IR heater or the like before heat-molding.

The pressure applied during heat-molding is also not particularly limited, and heat-molding is normally performed at a pressure of equal to or greater than 0.05 MPa. The pressure may be more preferably equal to or greater than 0.1 MPa and particularly preferably equal to or greater than 0.5 MPa. The upper limit of the pressure is not particularly limited, and the pressure may be about 30 MPa. The time for heat-molding is also not particularly limited, and is normally preferably equal to or shorter than 30 minutes, since there is a possibility that the polymer will be deteriorated if exposed to high temperatures for a long time. The time may be more preferably equal to or shorter than 25 minutes and particularly preferably equal to or shorter than 20 minutes. The lower limit of the time is not particularly limited, and the time may be about 1 minute. In addition, the thickness and the density of the obtained porous composite can be set as appropriate on the basis of the type of the reinforcing fibers and pressure to be applied. Furthermore, the shape of the obtained composite is also not particularly limited and can be set as appropriate. Depending on the purpose, it is also possible to stack a plurality of mixed nonwoven fabrics each having different product specifications all together and perform heat-molding, or to place a plurality of mixed nonwoven fabrics each having different product specifications separately in a mold having a certain size and perform heat-molding.

Since the porous composite has openings which are continuous openings, the porous composite can be suitable for use as a liquid permeable body for controlling the flow rate and flow direction of a liquid. In addition, the flow rate and flow direction of the liquid can be adjusted by changing the void content of the porous composite, the fiber orientation, etc.

Since the liquid permeable body according to the present invention has different liquid permeabilities between in the in-plane direction and in the out-of-plane direction, the liquid permeable body can be effectively used in various materials and members for which favorable flow in the in-plane direction and inhibition of flow in the out-of-plane direction are required when the liquid permeable body is disposed, for example, in materials and members used in agriculture, industry, civil engineering, various transportation vehicles, and the like.

In particular, when the liquid permeable body has predetermined mechanical properties and/or has heat resistance, the liquid permeable body according to one aspect of the liquid permeable body of the present invention can be advantageously used as a high-strength and/or heat-resistant body. In addition, according to one aspect of the liquid permeable body of the present invention, the liquid permeable body can have a reduced thickness with achieving excellent liquid permeability.

For example, when the liquid permeable body according to the present invention is used as a flow passage member for floor heating, flow of hot water in the out-of-plane direction can be inhibited, and hot water can also be diffused in the in-plane direction, whereby uniform temperature control is possible. In addition, for example, since the liquid permeable body according to the present invention has excellent strength, the liquid permeable body can also be used as a flow passage member for melting snow on a roof, and hot water can be diffused in the in-plane direction, whereby it is possible to inhibit local snowfall and the like due to non-uniform temperature control.

EXAMPLES

Hereinafter, the present invention will be further described in detail with reference to Examples below, which are not to be construed as limiting the scope of the present invention.

Reference Example 1 (Production of Polyetherimide Shortcut Fiber)

A polyetherimide (hereinafter, sometimes abbreviated as PEI) polymer ("ULTEM 9001" manufactured by SABIC Innovative Plastics Holding), which was an amorphous resin, was dried under vacuum at 150° C. for 12 hours. The PET polymer was discharged from nozzles having round holes, under the condition of a spinning head temperature of 390° C., a spinning speed of 1500 m/min, and a discharge rate of 50 g/min to obtain multi-filaments (2640 dtex/1200 f) of PEI. The thus-obtained multi-filaments were cut to a length of 15 mm to obtain shortcut PEI fibers. The obtained short cut fibers had good appearance without fuzzing, and had an average single fiber fineness of 2.2 dtex and an average single fiber length of 15.0 mm.

Reference Example 2 (Production of Polyetherimide Staple)

Multi-filaments (2640 dtex/1200 f) of PEI were obtained in the same manner as in Reference Example 1. The obtained multi-filaments were crimped and then cut to a length of 51 mm to obtain PEI staples. The obtained fibers had good appearance without fuzzing, and had an average single fiber fineness of 2.2 dtex and an average single fiber length of 51.0 mm.

Example 1

From a slurry containing 50 wt % of PEI shortcut fibers as thermoplastic fibers, 45 wt % of carbon fibers (manufactured by Toho Tenax Co., Ltd.; average fiber diameter: 7 μm) having a cut length of 12 mm as discontinuous reinforcing fibers, and 5 wt % of PVA fibers ("VPB-105-2", manufactured by Kuraray Co., Ltd.) as a binder, were obtained mixed nonwoven fabrics (mixed paper) each having a basis weight of 100 g/m$^2$ by performing paper-making at a speed of 5 m/min using a short net type wet-laid paper-making machine.

74 sheets of the obtained mixed nonwoven fabrics were stacked, heated at 340° C. for 10 minutes, while a surface thereof perpendicular to the stacking direction was pressed at 15 MPa, using a test press machine (KVHC-II, manufactured by Kitagawa Seiki Co., Ltd.) to allow PEI resin from the PEI shortcut fibers to be impregnated between the carbon fibers, and then cooled to 200° C., which was equal to or lower than the glass transition temperature of the PEI resin, while maintaining the pressing, to produce an intermediate composite having a thickness of 5.3 mm.

The obtained intermediate composite was heated at 340° C. to be expanded using the test press machine, with pressing both surfaces thereof perpendicular to the stacking direction at 5 MPa to give the intermediate composite a thickness of 10 mm. Thereafter, the intermediate composite was cooled to 200° C., which was equal to or lower than the glass transition temperature of PEI, to produce a porous composite constituting a liquid permeable body. Table 1 shows the measurement results of void content and fiber orientation angles and the evaluation results of mechanical properties and liquid permeability for the obtained liquid permeable body comprising the porous composite.

Example 2

An intermediate composite was produced in the same manner as Example 1, except that 44 sheets of mixed nonwoven fabrics were stacked in the intermediate composite production process. Thereafter, a porous composite constituting a liquid permeable body was produced in the same manner as Example 1. Table 1 shows the measurement results of void content and fiber orientation angles and the evaluation results of mechanical properties and liquid permeability for the obtained liquid permeable body comprising the porous composite.

Example 3

Mixed nonwoven fabrics were produced in the same manner as Example 2, except that the paper-making speed was adjusted to 10 m/min in the mixed nonwoven fabric production process. Thereafter, an intermediate composite and a porous composite constituting a liquid permeable body were produced in the same manner as Example 2. Table 1 shows the measurement results of void content and fiber orientation angles and the evaluation results of mechanical properties and liquid permeability for the obtained liquid permeable body comprising the porous composite.

Example 4

A mixture obtained by mixing 55 wt % of PEI staple as thermoplastic fibers and 45 wt % of carbon fibers (manufactured by Toho Tenax Co., Ltd.: 7 μm) having a cut length of 12 mm as discontinuous reinforcing fibers was defibrated using a carding machine to produce mixed nonwoven fabrics (needle-punched nonwoven fabrics) having a basis weight of 100 g/m² by a needle punch method. Thereafter, an intermediate composite and a porous composite constituting a liquid permeable body were produced in the same manner as Example 2. Table 1 shows the measurement results of void content and fiber orientation angles and the evaluation results of mechanical properties and liquid permeability for the obtained liquid permeable body comprising the porous composite.

Comparative Example 1

Mixed nonwoven fabrics were produced in the same manner as Example 2, except that the paper-making speed was adjusted to 1 m/min in the mixed nonwoven fabric production process. Thereafter, an intermediate composite and a porous composite constituting a liquid permeable body were produced in the same manner as Example 2. Table 1 shows the measurement results of void content and fiber orientation angles and the evaluation results of mechanical properties and liquid permeability for the obtained liquid permeable body comprising the porous composite.

Comparative Example 2

An intermediate composite was produced in the same manner as Example 1, except that 118 sheets of mixed nonwoven fabrics were stacked in the intermediate composite production process. Thereafter, a porous composite constituting a liquid permeable body was produced in the same manner as Example 1. Table 1 shows the measurement results of void content and fiber orientation angles and the evaluation results of mechanical properties and liquid permeability for the obtained liquid permeable body comprising the porous composite.
Evaluation, Measurement
Density
A piece having a length of 10 cm and a width of 10 cm was cut out from a porous composite sample constituting a liquid permeable body, the thickness (cm) and the weight (g) of the piece were measured, and a density was calculated by the following equation.

Density (g/cm³)=weight (g)/(thickness 100 (cm²))

Basis Weight
A piece having a length of 10 cm and a width of 10 cm was cut out from a porous composite sample constituting a liquid permeable body, the weight (g) of the piece was measured, and a basis weight was calculated by the following equation.

Basis weight (g/m²)=weight (g)/0.01 (m²)

Void Content
The void content (%) of a porous composite constituting a liquid permeable body was determined in accordance with JIS K7075 "Testing methods for carbon fiber content and void content of carbon fiber reinforced plastics".
Bending Strength, Bending Elastic Modulus
A bending strength (MPa) and a bending elastic modulus (GPa) were determined in accordance with JIS K7017 "Fibre-reinforced plastics composites—Determination of flexural properties". The axis of a test piece was set along the MD direction.
Fiber Orientation Angle
A composite was embedded in a two-component curing type epoxy resin ("Zeromer K Plus", manufactured by IMT Co., Ltd.) and cured, and then cut in a cross-section perpendicular to the MD direction (in an A-A' cross-section in FIG. 1). To the cut surface that exposed the cross-section surface of the composite, was applied the same epoxy resin to be cured, and the applied surface was polished with water-resistant abrasive paper and an alumina slurry. In the observation of thus-obtained polished surface using a microscope, all of the discontinuous reinforcing fibers exposed on the cross-section of the cut composite was observed to measure length "a" in the long axis direction, length "b" in the short axis direction, and intersection angle "0" between the bottom side (CD direction) of the composite and the long axis. FIG. 2 is a schematic diagram of a cut cross-section of the liquid permeable body comprising the porous composite.

From values obtained by measuring $a_n$, $b_n$, and $\theta_n$ of each of the discontinuous reinforcing fibers exposed on the cut plane (A-A' cross-section), the fiber orientation angles $\alpha_n$ and $\beta_n$ in the in-plane direction and the out-of-plane direction shown in FIG. 3 were calculated. Here, $\theta_n$ was measured in the range of 0 to 90°. In this case, the fiber orientation angle $\alpha_n$ in the in-plane direction is an intersection angle between the ZX plane including the axis along the thickness direction (Z direction) and the axis along the MD direction (X direction) and an XY plane component of the discontinuous reinforcing fiber, and the fiber orientation angle $\beta_n$ in the out-of-plane direction is an intersection angle between the XY plane including the axis along the MD direction (X direction) and the axis along the CD direction (Y direction) and a ZX plane component of the discontinuous reinforcing fiber. Then, the average value $\alpha$ of the fiber orientation angles in the in-plane direction and the average value $\beta$ of the fiber orientation angles in the out-of-plane direction were calculated according to the following calculation equations.

$$\alpha=(1/m)\cdot\Sigma\alpha_n=(1/m)\cdot\Sigma arccos(b_n/(a_n \cos \theta_n))$$

$$(n=1, 2, 3, \ldots, m)$$

$$\beta=(1/m)\cdot\Sigma\beta_n=(1/m)\cdot\Sigma arccos(b_n/(a_n \cos \theta_n))$$

$$(n=1, 2, 3, \ldots, m)$$

where m is the number of discontinuous reinforcing fibers exposed on the cut plane.

If the average value $\alpha$ of the fiber orientation angles exceeds 45° in the in-plane direction (Y direction) calculated as described above, the X direction is set as the in-plane direction, and the average value $\alpha$ of the fiber orientation angles in the in-plane direction is defined as a value obtained by subtracting the average value of the fiber orientation angles in the Y direction from 90°.
Liquid-Permeation Speed Evaluation
A liquid permeable body comprising a 10 mm thick porous composite was cut in a cross-section perpendicular to the MD direction (in-plane direction) by 10 mm along the MD direction, and then the obtained rod-shaped sample was cut to have a length of 50 mm in the CD direction to obtain a cut sample was regarded as a sample A. In addition, the liquid permeable body comprising the porous composite was cut in a cross-section perpendicular to the CD direction by 10 mm along the CD direction, and then the obtained rod-shaped sample was cut to have a length of 50 mm in the MD direction to obtain a cut sample was regarded as a sample B.

Next, the sample A was put in a stainless steel disk having a diameter of 80 mm and a thickness of 5 mm with a rectangular hole having a length of 10 mm and a width of 50 mm, such that a cut plane perpendicular to the MD direction of the sample A was exposed from the stainless steel disk, and the gap between the sample A and the stainless steel disk was filled with a silicone sealant.

In the case of the sample B, the sample B was put in a stainless steel disk with the same shape as above such that a cut plane perpendicular to the CD direction of the sample B was exposed from the stainless steel disk, and the gap between the sample B and the stainless steel disk was filled with a silicone sealant.

Each of the stainless steel disks was sandwiched between two connectors with conical shape in which each of the connectors has a bottom opening with an outer diameter of 80 mm, the opening having an edge provided a silicone packing, and each of the connectors has a top to which a pressure-resistant tube was connected. Then stainless steel disk was fixed with a clamp such that the stainless steel disk was sustained between the connectors.

Next, pure water was injected at a pressure of 2 kPa from one side of the connected sample to observe the volume of water flowing out from the other side and measure the time t (min) required to increase the total volume of flowing water from 20 mL to 40 mL.

From the obtained times, the in-plane liquid-permeation speeds (liquid-permeation speed in the X direction and liquid-permeation speed in the Y direction) of the samples A and B were calculated by the following equation.

$$\text{Liquid-permeation speed (mL/min)} = 20 \ (\text{mL})/t \ (\text{min})$$

Liquid-Permeation Anisotropic Value in In-Plane Direction

An in-plane anisotropy was calculated from the obtained liquid-permeation speed in the X direction and the obtained liquid-permeation speed in the Y direction by the following equation.

$$\text{Liquid-permeation anisotropic value in in-plane direction} = \text{liquid-permeation speed (mL/min) in } X \text{ direction/liquid-permeation speed (mL/min) in } Y \text{ direction}$$

Liquid-Permeation Anisotropic Value in in-Plane Direction with Respect to Out-of-Plane Direction The out-of-plane liquid-permeation speed (liquid-permeation speed in the Z direction) of the sample A was calculated in the same manner as the above liquid-permeation speed evaluation, except that the sample A was put in a stainless steel disk such that a surface perpendicular to the out-of-plane direction of the sample A was exposed from the stainless steel disk, and the gap between the sample A and the stainless steel disk was filled with a silicone sealant.

An out-of-plane anisotropic value was calculated from the obtained liquid-permeation speed in the X direction and the obtained liquid-permeation speed in the Z direction by the following equation.

$$\text{Liquid-permeation anisotropic value in in-plane direction with respect to out-of-plane direction} = \text{liquid-permeation speed (mL/min) in } X \text{ direction/liquid-permeation speed (mL/min) in } Z \text{ direction}$$

TABLE 1

| | | | | Ex. 1 | Ex. 2 | Ex. 3 | Ex. 4 | Com. Ex. 1 | Com. Ex. 2 |
|---|---|---|---|---|---|---|---|---|---|
| Configuration | Form | | | Mixed paper | Mixed paper | Mixed paper | Needle-punched nonwoven fabric | Mixed paper | Mixed paper |
| | Discontinuous reinforcing fiber | Type | | CF | CF | CF | CF | CF | CF |
| | | Fiber length | mm | 12 | 12 | 12 | 12 | 12 | 12 |
| | Thermoplastic resin | Type | | PEI | PEI | PEI | PEI | PEI | PEI |
| | | Tg | ° C. | 217 | 217 | 217 | 217 | 217 | 217 |
| | Mixed nonwoven fabric | paper-making speed | m/min | 5 | 5 | 10 | — | 1 | 10 |
| | | Mixture ratio Discontinuous reinforcing fiber | wt % | 45 | 45 | 45 | 45 | 45 | 45 |
| | | Thermoplastic fiber | wt % | 50 | 50 | 50 | 55 | 50 | 50 |
| | | Binder | wt % | 5 | 5 | 5 | — | 5 | 5 |
| | Composite | Thickness before expansion | mm | 5.3 | 3.1 | 3.1 | 3.1 | 5.3 | 8.4 |
| | | Thickness after expansion | mm | 10 | 10 | 10 | 10 | 10 | 10 |
| | | Expansion rate | % | 89 | 223 | 223 | 223 | 89 | 19 |
| | | Density | g/cm$^3$ | 0.74 | 0.44 | 0.44 | 0.44 | 0.74 | 1.18 |
| | | Basis weight | g/m$^2$ | 7350 | 4400 | 4400 | 4400 | 7350 | 11800 |
| | | Void content | % | 50 | 70 | 70 | 70 | 50 | 20 |
| | | Fiber orientation angle α in in-plane direction | ° (degree) | 36 | 36 | 25 | 22 | 41 | 36 |
| | | Fiber orientation angle β in out-of-plane direction | ° (degree) | 15 | 18 | 10 | 19 | 35 | 12 |
| Mechanical property | Bending strength | | MPa | 125 | 53 | 68 | 45 | 34 | 221 |
| | Bending elastic modulus | | GPa | 10.2 | 4.4 | 5.3 | 3.5 | 2.5 | 19.3 |
| Liquid-Permeation | Liquid-permeation speed in the X direction | | mL/min | 21 | 40 | 78 | 90 | 19 | 3 |
| | Liquid-permeation speed in the Y direction | | mL/min | 13 | 20 | 22 | 22 | 16 | 1.7 |
| | Liquid-permeation speed in the Z direction | | mL/min | 5 | 9 | 13 | 22 | 11 | 0.6 |
| | Liquid-permeation anisotropic value in in-plane direction | | — | — | 1.6 | 2 | 3.5 | 4.1 | 1.2 | 1.8 |
| | Liquid-permeation anisotropic value in in- | | — | — | 4.2 | 4.4 | 6 | 4.1 | 1.7 | 5 |

TABLE 1-continued

| | Ex. 1 | Ex. 2 | Ex. 3 | Ex. 4 | Com. Ex. 1 | Com. Ex. 2 |
|---|---|---|---|---|---|---|
| plane direction with respect to out-of-plane direction | | | | | | |

In Table 1, CF denotes carbon fibers, and PEI denotes polyetherimide-based resins.

Table 1 shows the evaluation results. Examples 1 to 4 reveal that the liquid permeable bodies each comprising the porous composite having an average fiber orientation angle of equal to or less than 40° in the in-plane direction and an average fiber orientation angle of equal to or less than 25° in the out-of-plane direction have high liquid-permeation speeds. Moreover, these liquid permeable bodies each comprising the porous composite show high liquid-permeation anisotropic values in the in-plane direction as well as high liquid-permeation anisotropic values in the in-plane direction with respect to the out-of-plane direction.

Comparing Examples 1 and 2 with Comparative Example 2, lower void contents lead to lower liquid-permeation speeds, i.e., the liquid-permeation speed increases as the void content increases.

Moreover, comparison of Example 1 and Comparative Example 1 reveals that, even having the same void content, the anisotropy of liquid permeability is small if the average values of the fiber orientation angles both in the out-of-plane direction and the in-plane direction are large and close to random orientation (45°).

Furthermore, Examples 2 and 3 show that decrease in average value of the fiber orientation angles in the in-plane direction enhances not only liquid-permeation anisotropic value in the in-plane direction but also the liquid-permeation speed.

Examples 2 to 4 show that the needle punch method allows the greater average value β of the fiber orientation angles in the out-of-plane direction comparing with the paper-making method. It is presumed that the needle punch method makes some fibers to be oriented in the out-of-plane direction by piercing with a needle in the out-of-plane direction.

As for the average value α of the average fiber orientation angle in the in-plane direction, there is a tendency that the average value α is smaller in the composite obtained by the needle punch method than those by the paper-making method. This is because, in the needle punch method, the fibers are oriented in one direction in the in-plane direction in the carding process.

INDUSTRIAL APPLICABILITY

Since the liquid permeable body comprising the porous composite obtained by the present invention has liquid permeability and is also lightweight and has high strength, the liquid permeable body can be used as a structural body, and application of the liquid permeable body to agricultural materials, industrial materials, civil engineering materials, and the like is expected.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention.

Accordingly, such changes and modifications are, unless they depart from the scope of the present invention as delivered from the claims annexed hereto, to be construed as included therein.

REFERENCE NUMERALS

1 . . . porous composite
2 . . . discontinuous reinforcing fiber
3 . . . epoxy resin used for resin embedding

What is claimed is:

1. A liquid permeable body comprising
a porous composite having a structure in which
discontinuous reinforcing fibers are dispersed;
the dispersed discontinuous reinforcing fibers are bonded to each other with a thermoplastic resin at at least an intersection of the reinforcing fibers;
voids of continuous openings form a void content of from 30 to 90%;
an average value α of fiber orientation angles is from 22 to 40° in an in-plane direction of the discontinuous reinforcing fibers;
an average value β of fiber orientation angles is from 0 to 25° in an out-of-plane direction of the discontinuous reinforcing fibers; and
a ratio α/β of the average value α to the average value β is from 1.1 to 5.0; wherein
a liquid-permeation anisotropic value of the liquid permeable body in the in-plane direction with respect to the out-of-plane direction (in-plane liquid-permeation speed/out-of-plane liquid-permeation speed) is from 2.0 to 12.0; and
a liquid-permeation anisotropic value of the liquid permeable body in the in-plane direction is from 1.3 to 8.0.

2. The liquid permeable body according to claim 1, wherein the thermoplastic resin has a glass transition temperature of equal to or higher than 100° C.

3. The liquid permeable body according to claim 1, wherein the thermoplastic resin is at least one thermoplastic resin selected from the group consisting of polyetherimide-based resins, semi-aromatic polyamide-based resins, polyether ether ketone-based resins, and polycarbonate-based resins.

4. The liquid permeable body according to claim 1, wherein the discontinuous reinforcing fibers have an average fiber length of from 3 to 50 mm.

5. The liquid permeable body according to claim 1, wherein a weight proportion (proportion by weight) of the discontinuous reinforcing fibers in the porous composite is from 15 to 80%.

6. The liquid permeable body according to claim 1, wherein the liquid permeable body has a bending strength of equal to or greater than 30 MPa and a bending elastic modulus of equal to or greater than 3.0 GPa.

7. The liquid permeable body according to claim 1, wherein at least one of the average values α and β is not 0.

8. The liquid permeable body according to claim 1, wherein the average value α of fiber orientation angles is from 22 to 38° in an in-plane direction of the discontinuous reinforcing fibers.

9. The liquid permeable body according to claim 1, wherein the average value α of fiber orientation angles is from 22 to 36° in an in-plane direction of the discontinuous reinforcing fibers.

10. The liquid permeable body according to claim 1, wherein the average value β of fiber orientation angles is from 10 to 25° in an out-of-plane direction of the discontinuous reinforcing fibers.

11. The liquid permeable body according to claim 1, wherein the average value β of fiber orientation angles is from 0 to 20° in an out-of-plane direction of the discontinuous reinforcing fibers.

12. The liquid permeable body according to claim 1, wherein the average value β of fiber orientation angles is from 0 to 15° in an out-of-plane direction of the discontinuous reinforcing fibers.

\* \* \* \* \*